Jan. 26, 1965         J. A. KAYSER         3,166,919

CONSTANT VELOCITY UNIVERSAL JOINT

Filed May 14, 1962

# United States Patent Office 3,166,919
Patented Jan. 26, 1965

3,166,919
CONSTANT VELOCITY UNIVERSAL JOINT
John A. Kayser, Oregon, Ohio, assignor to Dana Corporation, Toledo, Ohio, a corporation of Virginia
Filed May 14, 1962, Ser. No. 194,368
10 Claims. (Cl. 64—21)

This invention relates generally to constant velocity universal joints and is more specifically directed to an improvement in constant velocity universal joints of the general type disclosed in Patent No. 3,017,756 and in an application Serial No. 93,734 filed March 6, 1961, now Patent No. 3,106,077.

In constant velocity universal joints wherein the means for transmitting torque between the angularly displaceable elements also functions as the intermediate revolvable member, means must be provided to maintain the torque transmitting means in a uniplanar relationship and to position this plane in the bisecting position. Where the driving and driven members have axially straight grooves and drive balls disposed in the grooves to transmit torque between the members, these positioning means are essential, for when the members of the joint are substantially aligned, the cooperating grooves therein are substantially parallel and the drive balls contained in the grooves are free to move axially. When the drive and driven members are displaced angularly, the grooves lying within the plane of angular deflection remain axially aligned and assume a radially converging-diverging relationship. The drive balls contained therein are subjected to a force urging them axially toward the diverging end of the grooves. These forces are referred to as coupling forces and must be resisted to maintain the balls within the joint as well as within the bisecting plane. The grooves on opposite sides of the universal joint diverge and converge oppositely and therefore urge the balls contained therein in opposite directions. The coupling forces on each drive ball therefore are constantly reversed during rotation of an angularly displaced joint of the above type.

The grooves of the universal joint lying out of the plane of angular deflection assume a crossed or intersecting relationship. A drive ball contained within such a pair of intersecting grooves can only assume a position lying within the groove intersection and accordingly, are positioned by the intersection; which intersections by basic geometric principles, will lie in the bisecting plane. One groove of each pair of grooves (depending upon the direction of rotation) will also subject the ball contained therein to an axial urging force, but, unless the drive and driven members rotate relative to each other, these drive balls cannot move axially and will be maintained in the intersection and the axial urging forces thereon resisted by the other of the intersecting grooves. In respect to the balls in the intersecting grooves, the balls in the aligned grooves act as keys and do not allow relative rotation to occur between the members of the universal joint. Therefore, as long as the coupling forces on the drive balls lying in the plane of angular deflection is resisted and these are properly positioned, all the drive balls will be held in uniplanar relationship in the bisecting plane.

In view of the fact that during rotation of the universal joint, all the drive balls alternately lie in the angular plane, and the fact that at no deflection none of the grooves intersect to position the drive ball contained therein it is necessary to provide means to position every drive ball, which means must be sufficient to overcome these reversing coupling loads.

In prior art constant velocity universal joints of the above description, the dimensional tolerances of the components of the joint have to be held to a minimum so that the tolerance build up of the final assembly does not result in mispositioning of the torque transmitting means. Further, the reversal of coupling loads on the torque transmitting means requires minimum tolerances since a loose fit would allow these reversals to impose impact loads on the positioning means.

It is therefore an object of this invention to provide a constant velocity universal joint wherein the dimensional tolerances of the components thereof need not be held to a minimum.

It is another object of this invention to provide a constant velocity universal joint including means for positioning the bisecting plane of at least a part of the intermediate revolvable member, which means will accommodate a variation in the dimensions of the component of the universal joint.

It is a further object of this invention to provide such a universal joint including improved positioning means, which means do not interfere with the relative axial and angular displacement of the driving and driven members.

It is yet another object of this invention to provide such a universal joint including improved means for resisting the coupling forces imposed upon the torque transmitting means thereof.

It is yet a further object of this invention to provide such a universal joint wherein means are provided to inhibit the damaging effect of reverse coupling loads in the torque transmitting means.

Another object of this invention is to provide such a universal joint which is easy to manufacture, simple to assemble, relatively inexpensive, yet will provide long and durable service.

Further and other advantages of this invention will become apparent upon a consideration of the following specification when taken in conjunction with the drawings wherein.

Figure 1:
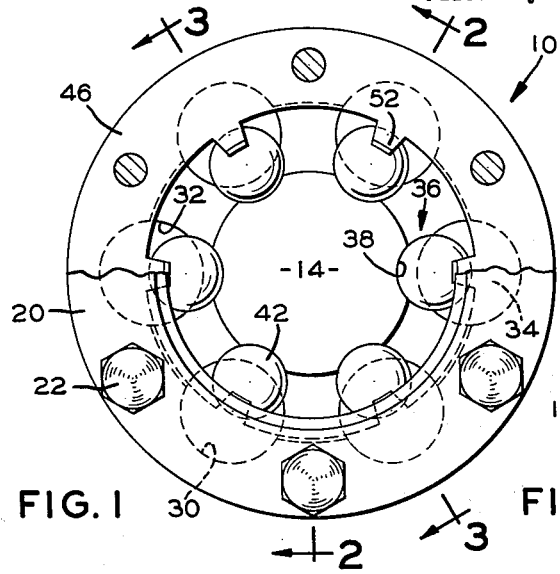
FIG. 1 is an end elevational view of a constant velocity universal joint embodying this invention with the top portion of the cover broken away to expose internal features.

In the preferred manner of practicing this invention, a constant velocity universal joint having drive balls to transmit torque between the relative angularly movable members thereof includes means for positioning the drive balls in the plane bisecting the angle defined by the angularly movable members. The present invention contemplates the inclusion of resilient means in the means for positioning the drive balls. A high operational level of dimensional variation of the components of the universal joint will be accommodated by the resilient means so that proper operation of the joint is assured. Further, by preloading the resilient means, the reverse coupling loads will not result in impact loads on the positioning means.

Referring now to the drawings, a universal joint generally indicated at 10 includes an annular outer ball race or member 12 having an axially extending opening 13 therein and being radially spaced from and enclosing an inner ball race or member 14. The inner member 14 is shown as an integral enlarged portion of the shaft 16; however, the shaft and inner member may be formed separately and interconnected in a suitable manner.

A pair of cover members 18 and 20 are secured to opposite sides of the outer member 12 by means of a plurality of bolts 22 which extend through a plurality of cooperating holes 24 in the cover 18, 26 in the outer member 12, and 28 in the cover 20. The outer member 12 may be adapted as a driving or driven member and is prepared to be secured to a suitable member of the drive line (not shown) as by means of bolts 22.

The outer and inner members 12 and 14 are provided with axially extending grooves 30 and 32 respectively, which grooves are disposed in paired cooperating relationship. Each pair of grooves 30 and 32 receive a driver ball 34 which is adapted to transmit torque therebetween and to function as the intermediate revolvable member of the universal joint 10.

Figure 2:
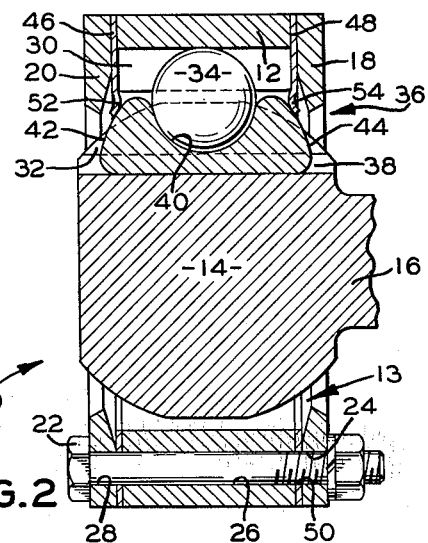
FIG. 2 is a cross sectional view taken along the lines 2—2 of FIG. 1.
Figure 3:
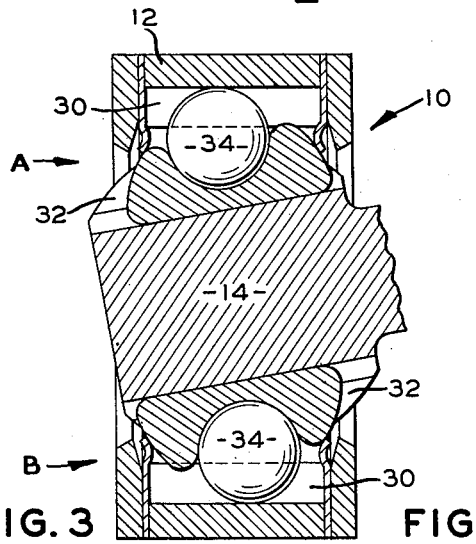
FIG. 3 is a sectional view taken along the lines 3—3 of FIG. 1 and showing the joint with the members disposed angularly.

With the universal joint as thus far described, no means has been provided to maintain the driver balls 34 in a uniplanar bisecting relationship when the outer and inner members 12 and 14 are substantially aligned (as shown in FIGS. 1 and 2) or when the outer and inner members are angularly disposed (as shown in FIG. 3).

Means are provided for positioning the driver balls 34 in a single plane bisecting the angle defined by the outer and inner members 12 and 14. More particularly, a cam member 36 is positioned in each groove 32 of the inner member 14 and is slidably received in a pilot groove 38 formed in the bottom of each groove 32. The cam members 36 each have a centrally depressed area 40 wherein the respective drive ball 34 is carried and positionably engaged thereby on both axial sides so that movement of the cam member 36 is transmitted to the driver balls 34. The axially opposite ends of the cam member 36 each take the form of a double curved convex cam surface 42 and 44 respectively. If desired, the cam member may be split medially into two separate axial portions and will still operate satisfactorily.

Resilient means in the form of a pair of spring members 46 and 48 are carried on opposite sides of the outer member 12. The spring members 46 and 48 are annular in form and provided with a plurality of openings 50 therein which openings are in registration with the bolts 22 so that upon securing the covers 18 and 20 to the outer member 12 the springs 46 and 48 are also secured thereto. A plurality of spring segments 52 and 54, of leaf spring configuration, are formed on the spring members 46 and 48 respectively and are positioned so as to depend therefrom. The portions of the springs 46 and 48 between the segments 52 and 54 are radially displaced sufficiently so as not to interfere with movement of the portion of the inner member 14 between the grooves 32 during relative movement of the inner and outer members. The segments 52 and 54 are disposed in aligned paired relationship so that they engage the cam surfaces 42 and 44 respectively and function as cam followers. If desired, each segment 52 and 54 may be formed separately and individually secured to the member 12. The segments 52 and 54 are sufficiently preloaded on assembly so that coupling forces on the cam members 36 are resisted without further substantial deflection.

Upon relative axial movement between the members 12 and 14, the cam members 36, balls 34, springs 46 and 48, and outer member 12 move unitarily relative to the inner member 14 while the cam members 36 slide relative to the member 14 in the grooves 38. Upon relative angular displacement between the outer and inner members 12 and 14, the segments 52 and 54 slidingly engage the surfaces 42 and 44 of the cam member 36 thereby positioning each cam so that the balls 34 carried thereby are disposed in the plane bisecting the angle defined by the members 12 and 14 and thereby may serve as the intermediate revolvable member.

Since the spring segments 52 and 54 while acting as cam followers were flexibly preloaded, dimensional tolerances in the size of the components of the universal joint 10 will interfere to a lesser degree with the positioning of the balls 34 in the bisecting plane than would be the case if stationary cam followers were utilized. In this manner proper constant velocity torque transfer is accomplished without locking of the joint members due to improperly positioned intermediate revolvable means. Further, as the coupling forces on the drive balls 34 are reversed from that imposed by the grooves 30 and 32 shown in FIG. 3 at A to that imposed by the grooves at B no impact forces occur on the positioning means.

Figure 4:
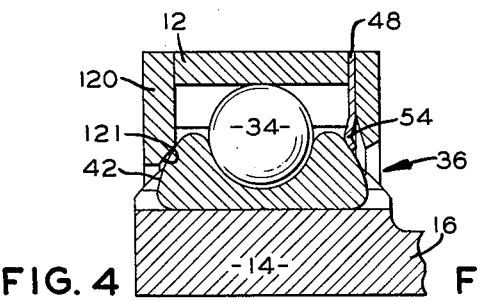
FIG. 4 is a view according to FIG. 2 of another embodiment of this invention.

Referring now to FIG. 4, a cover 120 has been formed with a cam follower 121 thereon which slidingly engages the cam surface 42 of the cam member 36. Spring member 48 and segments 54 remains the same as in the embodiment of FIGS. 1–3. The segments 54 are preloaded in assembly so that the cam members 36 are biased against the cam followers 121 and coupling loads are resiliently overcome. Since the segments 54 are flexible, they will yield to accommodate dimensional tolerances during assembly. As in the previous embodiment the outer member 12, the driver balls 34, spring 48, and cam member 36 move unitarily relative to the inner member 14 during relative axial displacement of the outer and inner members.

Figure 5:
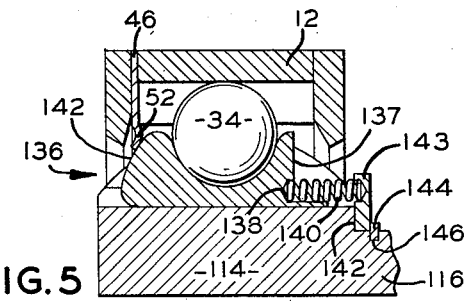
FIG. 5 is a view according to FIG. 2 of another embodiment of this invention.

In FIG. 5, the spring member 46 is positioned the same as in FIGS. 1–3; however, a cover such as 120 with a cam follower 121 can be satisfactorily substituted if desired. In this embodiment, the cam members 136 may be formed with only a single cam surface 142 for engaging the segments 52 of the spring 46. The other end of the cam member 136 is formed with a shoulder 137 having a spring pilot opening 138 therein, which opening is adapted to receive the inner end of a compression spring 140. The outer end of the spring 140 abuttingly engages an annular flange 143 which is secured against a shoulder 142 on the inner member 114 by a snap ring 144 positioned in a groove 146 in the shaft 116. The spring 140 constantly biases the cam member 136 against the cam follower in the form of the segment 52 (or the cam follower 121 on the cover 120) so that the cam member is properly positioned. In this embodiment the outer member 12, the driver balls 34, spring 46, and cam member 136 move unitarily relative to the inner member 14 during relative axial displacement of the outer and inner members. However, when so moving, the spring 140 deforms to accommodate such movement. For this reason, the embodiments of FIGS. 1–4 are more desirable.

Figure 6:
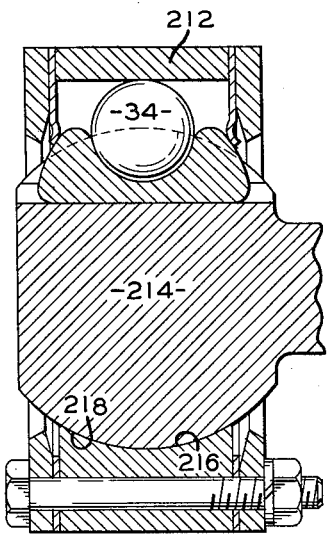
FIG. 6 is a view according to FIG. 2 of yet another embodiment of this invention.

In FIG. 6, a constant velocity universal joint is shown wherein the outer member 212 and inner member 214 are formed with spherical conforming surfaces 216 and 218 respectively. The balance of the joint, although shown as being identical to the embodiment of FIGS. 1–3, may be formed the same as any other of the previous embodiments. Since the outer and inner members conform, no relative axial movement is contemplated between the members of the universal joint.

While only several embodiments of this invention have been shown and described, it is apparent there may be many changes in structure as well as operation without departing from the scope of the appended claims.

What is claimed is:

1. A constant velocity universal joint comprising in combination an outer member having an axially extending opening, an inner member received in said opening, a plurality of separate and independent torque transmitting means drivingly connecting said members, a plurality of positioning means carried by at least one of said members with each of said positioning means positionably engaging a different one of said torque transmitting means and including a plurality of resilient means for individually biasing said torque transmitting means to a uniplanar relationship bisecting the angle defined by said members, said positioning means being independently movable relative to each other whereby variations in dimensional tolerances and coupling loads can be accommodated thereby.

2. A constant velocity universal joint comprising in combination an outer member having an axially extending opening, an inner member received in said opening, a plurality of torque transmitting means drivingly connecting said members, a plurality of cam members movably carried by one of said members and being independently movable relative to each other, each of said cam members positionably engaging a different one of said torque transmitting means, and a plurality of resilient means carried by one of said members and positionably engaging and individually and independently biasing said cam members, whereby said torque transmitting means are biased to a uniplanar relationship with said plane bisecting the angle defined by said members.

3. A constant velocity universal joint according to claim 2 wherein one resilient means of a plurality of resilient means engages each cam member of said plurality of cam members biases each cam member independently of the other of said cam members.

4. A constant velocity universal joint comprising in combination an outer member having an axially extending opening therein, an inner member received in said opening, said members each being provided with a plurality of angularly spaced grooves having at least an axial component, the grooves in said outer member being cooperably positioned with the grooves in the inner member, a plurality of torque transmitting means with at least one disposed in each of said cooperating grooves, a plurality of cam members slidably disposed in the grooves of one of said members and engaging said torque transmitting means disposed therein, and a plurality of resilient means carried by at least one of said members with one pair of resilient means of said plurality of resilient means engaging each of said cam members on opposed axial ends thereof, whereby said torque transmitting means are positioned in uniplanar relationship with the plane defined thereby in a position bisecting the angle defined by said members.

5. A constant velocity universal joint comprising in combination, an outer member having an axially extending opening therein, an inner member received in said opening, said members each having a plurality of angularly spaced grooves with at least an axial component, the grooves in said outer member being in paired cooperable relationship with the grooves in the inner member, a plurality of drive balls with at least one disposed in each of said pair of grooves, a plurality of cam members disposed in said grooves in one of said members and slidingly engaging said member and positionably engaging said drive balls contained therein, said cam members each having a cam surface on each axial end thereof, and a plurality of pairs of cam followers carried by the other of said members with each cam follower of each pair of cam followers engaging opposite axial ends of one of said cam members, at least one cam follower of each pair of cam followers being resiliently deformable and being preloaded upon assembly of the universal joint, whereby said drive balls are positioned by said cam members and said cam followers in a uniplanar relationship with the plane defined thereby in a position bisecting the angle defined by said members.

6. A universal joint according to claim 5 wherein both said cam followers of each pair of cam followers are resiliently deformable and preloaded upon assembly of the universal joint.

7. A constant velocity universal joint comprising in combination, an outer member having an axially extending opening therein, an inner member received in said opening and adapted for both angular and axial movement relative to said outer member, said members each having a plurality of angularly spaced grooves with at least an axial component, the grooves in said outer member being in paired cooperable relationship with the grooves in the inner member, a plurality of drive balls with at least one disposed in each of said pair of grooves, a plurality of cam members disposed in the grooves in one of said members and slidingly engaging the same and positionably engaging said drive balls contained therein for unitary movement therewith, each of said cam members having a cam surface on each axial end thereof, and a plurality of pairs of cam followers carried by the other of said members with each cam follower of each pair of cam followers engaging opposite axial ends of one of said cam members, at least one cam follower of each pair of cam followers being resiliently deformable and adapted to be preloaded upon assembly of the universal joint, said other member, said cam followers, said cam members and said drive balls moving unitarily relative to said one member upon relative axial movement between said members, whereby said drive balls are positioned by said cam members and said cam followers in a uniplanar relationship with the plane defined thereby in a positon bisecting the angle of said members.

8. A constant velocity universal joint according to claim 7 wherein both said cam followers of each pair of cam followers being resiliently deformable and adapted to be preloaded upon assembly of the universal joint.

9. A constant velocity universal joint comprising in combination an outer member having an axially extending opening therein, an inner member received in said opening, said members each having a plurality of angularly spaced grooves with at least an axial component, the grooves in said outer member being in paired cooperable relationship with the grooves in said inner member, a plurality of drive balls with at least one disposed in each of said pair of grooves, a plurality of cam members with one disposed in each of said grooves in one of said members and slidingly engaging said member and positionably engaging said drive ball contained therein for unitary movement therewith, said cam members each having a cam surface on each axial end thereof, and a plurality of pairs of cam followers carried by the other of said members with one pair of said plurality of pairs of cam followers cooperating with each cam member, one cam follower of each pair of cam followers engaging one axial end of said cam member cooperating therewith and the other cam follower of each pair of cam followers engaging the opposite axial end of said cam member cooperating therewith, one cam follower of each pair of cam followers being resiliently deformable and preloaded upon assembly of the universal joint thereby biasing the engaged cam member into engagement with the other of said pair of cam followers, said other cam followers being substantially rigid whereby said drive balls are positioned by said cam members and said cam followers in a uniplanar relationship with the plane defined thereby in a position bisecting the angle defined by said members.

10. A constant velocity universal joint comprising in combination an outer member having an axially extending opening therein, an inner member received in said opening, each of said members having a plurality of angularly spaced grooves with at least an axial component, the grooves of said outer member being in paired cooperable relationship with the grooves of the inner member, a plurality of drive balls with at least one disposed in each of said pair of grooves, a plurality of cam members disposed in said grooves in one of said members and slidingly engaging said member and positionably engaging said drive ball contained therein for unitary movement therewith, said cam members each having a cam surface on at least one axial end thereof, and a plurality of cam followers carried by the other of said members with each cam follower engaging a cam surface on one of said cam members, and a plurality of spring means carried by said one member and individually biasing said cam members into engagement with said cam followers whereby said drive balls are positioned by said cam members and said cam followers in a uniplanar relationship with the plane defined thereby in a position bisecting the angle defined by said members.

References Cited in the file of this patent
UNITED STATES PATENTS

| | | |
|---|---|---|
| 2,010,899 | Rzeppa | Aug. 13, 1935 |
| 2,427,237 | Suczek | Sept. 9, 1947 |
| 2,432,395 | Dunn | Dec. 9, 1947 |
| 2,615,317 | Rzeppa | Oct. 28, 1952 |
| 2,862,373 | Gibson | Dec. 2, 1958 |
| 2,897,660 | Croset | Aug. 4, 1959 |
| 2,932,180 | Smith-Pert | Apr. 12, 1960 |
| 3,106,077 | Sharp | Oct. 8, 1963 |

FOREIGN PATENTS

| | | |
|---|---|---|
| 731,547 | Great Britain | June 8, 1955 |